No. 624,767. Patented May 9, 1899.
M. ECKER.
MEASURING DEVICE.
(Application filed Feb. 1, 1899.)

(No Model.)

WITNESSES:
Edward Thorpe
H. L. Reynolds.

INVENTOR
Morris Ecker
BY 
ATTORNEYS.

UNITED STATES PATENT OFFICE.

MORRIS ECKER, OF NEW YORK, N. Y., ASSIGNOR OF ONE-HALF TO LENA STERN, OF SAME PLACE.

MEASURING DEVICE.

SPECIFICATION forming part of Letters Patent No. 624,767, dated May 9, 1899.

Application filed February 1, 1899. Serial No. 704,105. (No model.)

*To all whom it may concern:*

Be it known that I, MORRIS ECKER, of the city of New York, borough of Brooklyn, in the county of Kings and State of New York, have invented a new and Improved Measuring Device, of which the following is a full, clear, and exact description.

My invention relates to an improvement in measuring devices of that class which comprises a wheel which is to be rolled upon the object to be measured and which operates a registering or counting mechanism.

My invention consists of a novel means by which the wheels or disks forming the counter may be readily returned to zero from any position.

Reference is to be had to the accompanying drawings, forming a part of this specification, in which similar characters of reference indicate corresponding parts in all the figures.

Figure 1:
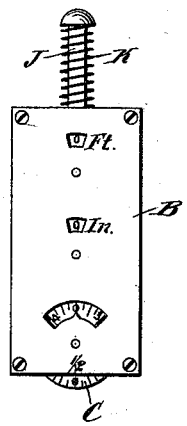
Figure 2:
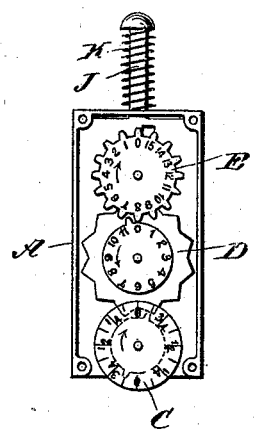
Figure 3:
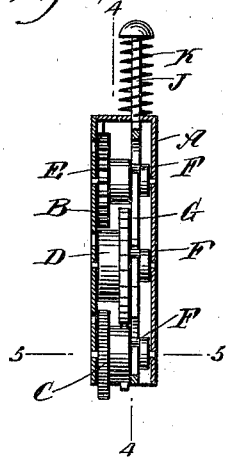
Figure 4:
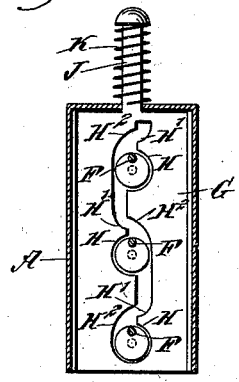
Figure 5:
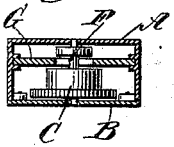
Figure 5:
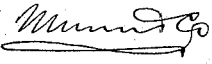

Figure 1 is a front view of the device. Fig. 2 is a similar view with the cover removed. Fig. 3 is a longitudinal section of the device. Fig. 4 is a section taken at right angles to Fig. 3 on the line 4 4 of Fig. 3; and Fig. 5 is a section taken upon the line 5 5 of Fig. 3, the lower wheel being shown in elevation.

My device is inclosed within a shallow casing A, provided with a cover B, capable of being removed when desired. Within the casing are mounted to turn three disk-wheels C, D, and E, the wheel C having its periphery projecting somewhat from the end of the casing and each wheel having a dial thereon marked with suitable figures. The casing may be of any suitable length and thickness to accommodate the wheels C, D, and E; but its width is preferably one inch, for a purpose which will be hereinafter explained. The cover B, which closes the casing, is provided with a series of slots, the upper one (marked "Ft.") reading feet, the intermediate one (marked "In.") reading inches, and the lower one reading subdivisions of inches and disclosing the figures upon the disks, so that the total reading of the disks may be obtained, and said cover is also marked "½" at a point intermediate of its lower end, indicating that the cover is one inch wide. The three disk-wheels are connected with each other in any suitable or desirable manner, so as to operate as a counting mechanism. The exact method of providing for the turning of the wheels is immaterial, and will consequently not be described in detail.

The number of figures placed upon the disks which form a part of or are connected with the wheels will depend upon the purpose for which the device is to be used. Each of the wheels has a crank-pin F connected therewith and so placed with relation to the dials of said wheels that the crank-pins are all on the center and in the same direction from the center of the wheel when the dials stand at zero. This is clearly shown by reference to Fig. 4.

A plate G is mounted to slide within the casing and has a slot extending lengthwise thereof and near the center, the crank-pins F passing through this slot. The outline of this slot is irregular, the sides being provided with projections having cam-surfaces H, H', and $H^2$, adapted to engage the pins F and turn the wheels back to zero when the slide is moved downward. It will be noticed that the projection having the cam-surfaces H and H' upon opposite sides thereof does not extend quite to the center line of the wheels, but extends far enough so that the end thereof will just pass the pin F when the latter is in the central position. The projection having the cam-surfaces $H^2$, which is located above the opposite projection having the cam-surfaces H H', extends beyond the center line of the wheels. The cam-surfaces $H^2$ and H' are separated from each other a sufficient distance to permit the pins F to pass between them.

The slide G has a stem J projecting through the upper end of the casing and surrounded with a spiral spring K, which normally holds the stem in elevated position. In using my device it is held with the lower wheel C in contact with the object to be measured and is moved along the same, the wheel C being turned by contact with said object. When it is desired to return the wheels to zero, the stem J is pushed inward, the cam-surfaces upon the plate G thus engaging the pins F and turning the wheels all to zero position. The action of the device in accomplishing this result is as follows: Supposing that the upper pin F (shown in Fig. 4) lies to the left of the center, in pressing the slide downward the cam-surface H² will engage the pin and carry it to the right hand of the center line. When the slide returns under the influence of the spring K, the cam-surface H' will engage the pin and carry it to the left until it passes the end of the projection having said surface thereon. The end of this projection is so placed that it will just clear the pin F when the latter is in the central position. The pin will therefore be left in its uppermost and central position. If the pin F lies to the right of the center line, the cam-surface H will first engage the pin and force it to the central position, where it will pass by the end of the projection having said cam-surface thereon. The continued forward movement of the slide will cause the pin to engage the cam-surface H², when it will be carried back to the right a slight distance, where it will be engaged by the cam-surface H' when the slide returns, thus leaving the pin in exactly the same position as when it was first engaged by the cam-surface H².

It will be noticed that the cam-surfaces which engage the central one of the three pins F are reversed in position from the end cam-surfaces. This is not, however, an essential feature; but said cam-surfaces are placed in this way simply for convenience.

The device herein shown and described is in such form that it is very convenient for use in measuring any kind of material, as it can be used very rapidly and brought back to zero as often as desired.

In using the device to measure a floor, for instance, the casing is placed in a vertical position against a wall of the room, the wheel C engaging the floor, and is then moved along the floor to the opposite wall of the room. As the center line of the casing and of the counting mechanism was at starting and is at finishing one-half inch distant from the respective walls, it is only necessary in order to determine the distance from wall to wall to add one inch to the total displayed at the slots in the cover B.

Having thus described my invention, I claim as new and desire to secure by Letters Patent—

1. A measuring device, comprising a train of counting-wheels, one of which is adapted to roll upon the object being measured, each wheel having a crank and pin and all of said cranks being in the same direction from their respective centers when the wheels are in zero position, and a slide movable in the direction occupied by the cranks when in this position, and having a pair of cam projections for each crank extending from opposite sides and adapted when the slide is reciprocated to engage the crank-pin and turn the counting-wheels to zero position, substantially as described.

2. A measuring device, comprising a train of counting-wheels, one of which is adapted to roll upon the object being measured, each wheel having a crank and pin and all of said cranks being in the same direction from their respective centers when the wheels are in zero position, and a slide movable in the direction occupied by the cranks when in this position, and having a pair of cam projections for each crank, extending from opposite sides and adapted when the slide is reciprocated to engage the crank-pin and turn the counting-wheels to zero position, one projection in each pair extending sufficiently to push the crank to the center and the other extending beyond the center and engaging the pin later in the movement of the slide than the first projection, the two projections being separated sufficiently to accommodate the pin between them, substantially as described.

3. A measuring device, comprising a train of counting-wheels, one of which is adapted to roll upon the object being measured, each wheel having a crank and pin and all of said cranks being in the same direction from their respective centers when the wheels are in zero position, and a slide movable in the direction occupied by the cranks when in this position, and having a pair of cam projections for each crank, extending from opposite sides and adapted when the slide is reciprocated to engage the crank-pin and turn the counting-wheels to zero position, a casing surrounding the slide and wheels, the slide having a stem extending outside the casing, and a spring surrounding the stem to return the slide, substantially as described.

MORRIS ECKER.

Witnesses:
EVERARD BOLTON MARSHALL,
F. W. HANAFORD.